Patented Apr. 10, 1945

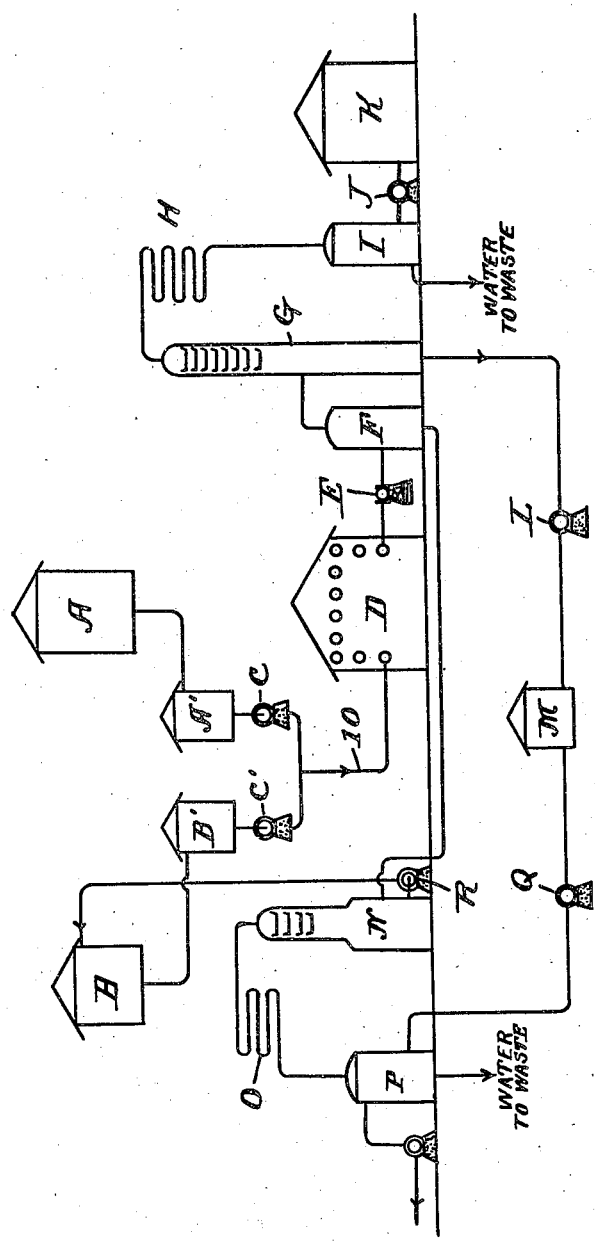

2,373,475

UNITED STATES PATENT OFFICE 2,373,475

PROCESS FOR SYNTHESIZING HYDROCARBONS FROM ALCOHOLS WITH TETRAPHOSPHORIC ACID CATALYST

James W. Jean, Altadena, Calif.

Application January 30, 1942, Serial No. 428,836

4 Claims. (Cl. 260—682)

This invention relates to a continuous process for synthesizing high quality hydrocarbons from alcohols and a catalyst therefor. More particularly this application is a continuation in part of the companion application filed by me March 10, 1941, bearing Serial Number 382,587, and relates to synthesis from alcohols derived from vegetable materials by fermentation.

Among the objects of this invention is to provide a method of obtaining hydrocarbons boiling largely in the gasoline range and of a quality suitable for aviation use, and all other types of internal combustion engines, substantially without any mechanical changes, or carburetor adjustments of any kind.

The alcohols herein referred to as a source of hydrocarbons are those of two or more carbon atoms per molecule, namely, ethanol, propanol, normal and iso-butanol, normal and iso-pentanol and the various hexanols.

As a process the invention comprises contacting an alcohol or mixture of alcohols with a catalyst comprising tetra phosphoric acid and passing the combination through a heated zone, said zone being maintained at a temperature of from about 200 degrees F. to 350 degrees F. and while under a pressure of from about 250 to 350 pounds per square inch. While being maintained at this temperature and pressure a double exothermic reaction takes place. The tetra phosphoric acid having the ability of dehydrating and polymerizing simultaneously and releasing the mixture into a chamber where separation of the catalyst and hydrocarbons takes place, the lighter hydrocarbons released going overhead, while the heavier catalyst remains at the bottom of the chamber, inasmuch as the tetra phosphoric acid has the ability of maintaining the water of dehydration in chemical combination. It is then removed from the bottom of the chamber by means of a pump, and passes on to a vacuum still where the water of dehydration is removed, therefore making the catalyst ready for reuse. It is then pumped back to the original starting tank where the cycle is repeated.

The ratio of tetra phosphoric acid to alcohols varies, depending on the type of alcohols being used. In processing normal or secondary butyl alcohols, the preferred ratio of alcohols to catalyst is 1.7 to 1, while the ratio of iso-propyl and propyl alcohols are 1.5 to 1, and with ethyl alcohol the ratio preferred is 1 to 1. Mixtures of these alcohols can be used and the ratio then is intermediate between the alcohols being used, that is to say if a mixture of 50% ethyl alcohol and 50% normal butyl alcohol is to be processed, then a ratio of 1.4 to 1 is a satisfactory ratio. As another example 4000 c. c. of tetra phosphoric acid, and 1000 c. c. of ethyl alcohol and 5000 c. c. of normal butyl alcohol, being a ratio of 1.5 to 1. This mixture when processed in this ratio will give substantially quantitative yields of hydrocarbons of a high quality and boiling largely in the gasoline range.

*Example of a crude sample*

| | |
|---|---|
| 1 B. P. | degrees F. 120 |
| 5% | do.____ 155 |
| 10% | do.____ 190 |
| 20% | do.____ 214 |
| 30% | do.____ 220 |
| 40% | do.____ 236 |
| 50% | do.____ 240 |
| 60% | do.____ 248 |
| 70% | do.____ 260 |
| 80% | do.____ 288 |
| 90% | do.____ 312 |
| 95% | do.____ 368 |
| End point | do.____ 431 |
| Recovery | percent 98 |
| Octane number | 81.3 |

Not hydrogenated.

The hydrocarbon can be hydrogenated if desired by any of the well known methods to increase the octane number to substantially 95–97.

The boiling range of the hydrocarbon can be controlled for lighter or heavier material by adjusting the mixture of alcohols, and without altering the operating condition of temperature or pressure.

The accompanying drawing is a diagrammatic view of apparatus by which my improved process can be practiced, the drawing constituting a typical flow sheet. In this drawing mixed alcohols are stored in tank A and auxiliary tank A'. Likewise tetra phosphoric acid is stored in tank B and auxiliary tank B'. Proportioning pumps C and C' take up their relative proportions as stated above of mixed alcohols and tetra phosphoric acid and commingle them in a single duct 10 leading to heating coils D of a heating unit. In the heating unit the temperature is increased to the proper reacting point of commingled materials, between 200 degrees to 350 degrees F. and under a pressure of from three to four hundred pounds per square inch. The rate of flow and temperature in the heating furnace is so controlled that in the passage through the coils the reaction between the two substances is complete at the outlet end of the coils. The hot reacted liquid is released by the pressure controlled valve E to normal pressure into chamber F where separation of the hot liquid and vapors is accomplished. At this point the vapors pass on through their special recovery system.

Returning now to the vapors released in vessel F, the hot vapors are partly cooled by their own expansion and pass into a rectifying column G where the lighter vapors are allowed to pass freely over the top, thence through cooler coils H where they are condensed into a liquid. However, a small amount remains as a gas or vapor and is allowed to separate in the vessel I, from which the gases or vapors are either allowed to escape into the atmosphere or may be recycled (not shown) through the heater coils D. The liquid hydrocarbons and some water also separate out in vessel I from whence the hydrocarbons are propelled by pump J to storage tank K for commercial disposal. The water which is separated out in vessel I is allowed to run to waste.

The heavier hydrocarbons separated out in the base of column G is propelled by pump L in the usual way to storage tank M for further disposal. The heavy liquid separated out in vessel F is transferred to a vacuum still N where under a high vacuum the water is extracted from the catalyst while any entrained hydrocarbons are separated out, these vapors passing through a cooling coil O and are condensed, the condensation liquid passing into vessel P. The separated water passes to waste and the top hydrocarbon layer is propelled by pump Q back into the storage tank M for further disposal.

The heavy tetra phosphoric acid separating out in the vacuum still N is propelled by pump R to the storage tank B where it is returned to the system for repeated use.

The operation as described is continuous, the tetra phosphoric acid catalyst being repeatedly used over and over thus producing economy, reducing cost and increasing efficiency.

I claim:

1. A continuous process for producing high quality liquid motor fuel, which comprises, commingling alcohol with a simultaneously dehyrating and polymerizing catalyst composed of tetraphosphoric acid, passing the combination through a zone maintained at a temperature of approximately 200° F. to 350° F. while under super-atmospheric pressure, separating the resulting vapor from the liquid, and finally condensing the vapor into liquid fuel.

2. A continuous process for producing high quality liquid motor fuel, which comprises, contacting a mixture of alcohols with a simultaneously dehydrating and polymerizing catalyst composed of tetraphosphoric acid, passing the combination through a zone maintained at a reacting temperature substantially not below 200 degrees F. while under super-atmosphere pressure, separating the resulting vapor from the liquid, condensing the vapor into motor fuel and separating the catalyst from said liquid.

3. In the continuous process as defined in claim 2, the catalyst separated from the liquid being returned for reuse in treating the mixture of alcohols.

4. A process for producing liquid hydrocarbon, adapted for use as motor fuel, from alcohols derived by fermentation which consists in co-mingling the alcohol with a catalyst of tetraphosphoric acid, one volume of catalyst being employed with from one to one and seven-tenths volume of alcohol, passing this mixture through a heated zone maintained at super-atmospheric pressure, separating the resulting vapor from the liquid passing from the heated zone and condensing the vapor into said motor fuel.

JAMES W. JEAN.